United States Patent
Saito

(10) Patent No.: US 10,040,315 B2
(45) Date of Patent: Aug. 7, 2018

(54) PNEUMATIC TIRE

(71) Applicant: BRIDGESTONE CORPORATION, Tokyo (JP)

(72) Inventor: Takahiro Saito, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 90 days.

(21) Appl. No.: 14/392,138

(22) PCT Filed: Mar. 19, 2014

(86) PCT No.: PCT/JP2014/057584
§ 371 (c)(1),
(2) Date: Jan. 7, 2016

(87) PCT Pub. No.: WO2014/208149
PCT Pub. Date: Dec. 31, 2014

(65) Prior Publication Data
US 2016/0272005 A1 Sep. 22, 2016

(30) Foreign Application Priority Data

Jun. 24, 2013 (JP) ................................. 2013-131318

(51) Int. Cl.
*B60C 5/00* (2006.01)
*C08L 7/00* (2006.01)
(Continued)

(52) U.S. Cl.
CPC .............. *B60C 1/0008* (2013.01); *B60C 5/14* (2013.01); *B60C 9/02* (2013.01); *C08K 5/3415* (2013.01);
(Continued)

(58) Field of Classification Search
CPC ...... C08K 5/0025; C08K 5/3415; C08K 5/34; C08L 9/00; C08L 7/00
See application file for complete search history.

(56) References Cited

U.S. PATENT DOCUMENTS 6,506,849 B1 * 1/2003 Hojo ........................ B60C 1/00
525/332.7
6,814,116 B2 * 11/2004 Uchino ..................... B60C 1/00
152/451
(Continued)

FOREIGN PATENT DOCUMENTS

JP 60-261706 A * 12/1985 ............... B60C 5/14
JP 60261706 A 12/1985
(Continued)

OTHER PUBLICATIONS

Communication dated Jun. 1, 2016 from the European Patent Office in counterpart European application No. 14818215.7.
(Continued)

*Primary Examiner* — Rip A Lee
(74) *Attorney, Agent, or Firm* — Sughrue Mion, PLLC

(57) ABSTRACT

Pneumatic tire wherein a rubber layer (A) is disposed as an inner liner at an innermost layer side of the tire, and a rubber layer (B) disposed between the above inner liner and a carcass ply layer and adjacent to the above inner liner comprises a rubber composition containing a natural rubber alone or a natural rubber and a synthetic diene rubber as a rubber component, wherein rubber layer (A) contains a butyl rubber alone or a blend rubber of a diene rubber and a specific amount of a butyl rubber as a rubber component; rubber layer (B) contains a bismaleimide compound as a cross-linking agent, sulfur and a vulcanization accelerator; a blend amount of the sulfur and a blend amount of the vulcanization accelerator are modified to specific ranges;
(Continued)

and an elongation at break after subjected to air heat aging at 100° C. for 250 hours is 150% or more.

5 Claims, 2 Drawing Sheets

(51) Int. Cl.
*C08K 5/34* (2006.01)
*B60C 1/00* (2006.01)
*B60C 5/14* (2006.01)
*C08K 5/3415* (2006.01)
*C08L 9/00* (2006.01)
*B60C 9/02* (2006.01)

(52) U.S. Cl.
CPC ...... *C08L 7/00* (2013.01); *C08L 9/00* (2013.01); C08L 2201/08 (2013.01); C08L 2205/06 (2013.01); C08L 2312/00 (2013.01)

(56) References Cited

U.S. PATENT DOCUMENTS

| 7,404,424 | B2 * | 7/2008 | Higuchi | B60C 1/0008 |
| | | | | 152/458 |
| 8,672,010 | B2 * | 3/2014 | Yanai | C08L 7/00 |
| | | | | 152/527 |
| 9,725,524 | B2 * | 8/2017 | Yamamoto | C08C 19/20 |
| 2002/0088522 | A1 * | 7/2002 | Uchino | B60C 1/00 |
| | | | | 152/537 |
| 2002/0134480 | A1 * | 9/2002 | Taguchi | B60C 1/0008 |
| | | | | 152/510 |
| 2006/0000531 | A1 * | 1/2006 | Ezawa | B60C 1/00 |
| | | | | 152/510 |
| 2013/0025757 | A1 | 1/2013 | Tomoi et al. | |
| 2013/0030097 | A1 | 1/2013 | Salgues et al. | |

FOREIGN PATENT DOCUMENTS

| JP | 61-51041 A | 3/1986 | |
| JP | 2-284935 A * | 11/1990 | ............... C08L 7/00 |
| JP | 7186609 A | 7/1995 | |
| JP | 10-297209 A * | 11/1998 | ............... B60C 5/14 |
| JP | 11-106567 A | 4/1999 | |
| JP | 2001-164043 A * | 6/2001 | ............... C08L 7/00 |
| JP | 2004-114903 A * | 4/2004 | ............... B60C 1/00 |
| JP | 2004114903 A | 4/2004 | |
| JP | 2006-36855 A * | 2/2006 | ............... C08L 7/00 |
| JP | 2006-152177 A * | 6/2006 | ............... C08L 9/00 |
| JP | 2008-144023 A * | 6/2008 | ............... C08L 7/00 |
| JP | 2008144023 A | 6/2008 | |
| JP | 2009-78808 A * | 4/2009 | ............... B60C 1/00 |
| JP | 2009132835 A | 6/2009 | |
| JP | 2011-225678 A * | 11/2011 | ............... C08L 51/04 |
| JP | 2012-46051 A * | 3/2012 | ............... B60C 5/14 |
| JP | 2012-46614 A | 3/2012 | |
| JP | 2013-515115 A | 5/2013 | |
| JP | 2013-154857 A * | 8/2013 | ............... B60C 5/14 |
| WO | WO 2012/165561 A1 * | 12/2012 | ............... C08L 7/00 |

OTHER PUBLICATIONS

International Search Report of PCT/JP2014/057584 dated Jun. 17, 2014.
International Preliminary Report on Patentability dated Jan. 7, 2016 and Written Opinion, issued by the International Bureau in corresponding International Application No. PCT/JP2014/057584.

* cited by examiner

PNEUMATIC TIRE

CROSS REFERENCE TO RELATED APPLICATIONS

This application is a National Stage of International Application No. PCT/JP2014/057584 filed Mar. 19, 2014, claiming priority based on Japanese Patent Application No. 2013-131318, filed Jun. 24, 2013, the contents of all of which are incorporated herein by reference in their entirety.

TECHNICAL FIELD

The present invention relates to a pneumatic tire, particularly a pneumatic tire suited to use in heavy load vehicles such as large-sized vehicles, more specifically to a pneumatic tire suited to use in heavy load vehicles which is provided with an excellent durability by improving a rubber layer brought into direct contact with an inner liner.

BACKGROUND ART

In general, pneumatic tires for heavy load vehicles are used in a severe environment, and therefore a rubber composition which is excellent in durability has to be used for rubber members constituting the above pneumatic tires for heavy load vehicles, for example, an inner liner and a rubber layer brought into direct contact with the above inner liner.

In a pneumatic tire of a tubeless type for heavy load vehicles, a rubber which is excellent in an air impermeability has so far been desired for an inner liner, and a halogenated butyl rubber alone or a blend rubber of a halogenated butyl rubber with a diene rubber considering an adhesive property and rubber adjacent to an inner liner is usually used therefor.

However, sufficiently high adhesion after vulcanization is not obtained by a halogenated butyl rubber alone, and if puncturing and dragging are brought about, an inner liner is peeled off, so that a blend rubber of a halogenated butyl rubber and a diene rubber is used frequently at the sacrifice of an air impermeability in order to improve an adhesive force.

Known as conventional rubber compositions for inner liners of tires, rubber layers brought into direct contact with inner liners, and the like are:
1) a rubber composition for an inner liner of a tire prepared by blending 100 parts by weight of a diene rubber containing 50% by weight or more of a halogenated butyl rubber with 0.5 to 4 parts by weight of polyalkylene glycol having a molecular weight of 106 to 500 and 0 to 0.3 part by weight of sulfur as a rubber composition for an inner liner of a tire, which makes it hard to bring about a compression set even under a high temperature and a high pressure in running while inhibiting a change in a modulus and maintaining a heat aging resistance (refer to, for example, patent document 1),
2) a tire for heavy load vehicles in which a rubber composition prepared by blending 100 parts by mass of a rubber component containing total 50 to 98% by mass of at least one of a natural rubber and a polyisoprene rubber and 2.0 to 15.0% by mass of a trans-polybutadiene rubber with 40 to 80 parts by mass of carbon black having a $N_2SA$ of 20 to 70 $m^2/g$ and a DBP oil absorption of 60 to 130 ml/100 g, and 3 to 14 parts by mass of sulfur, or a rubber composition prepared by blending 100 parts by mass of a rubber component containing total 50 to 100% by mass of at least one of a natural rubber and a polyisoprene rubber with 40 to 80 parts by mass of carbon black having a $N_2SA$ of 20 to 70 $m^2/g$ and a DBP oil absorption of 60 to 130 ml/100 g, 3 to 14 parts by mass of sulfur, and 0.3 to 2.0 parts by mass of a heat-resistant cross-linking agent is applied to an interlayer rubber located between a carcass and an inner liner (refer to, for example, patent document 2 filed by the present applicants),
3) a heavy load bias tire in which a rubber composition prepared by blending 1 to 8 parts by weight of a non-reactive alkylphenol resin having a softening point of 60 to 115° C. and an acid value of 1 to 60 with 100 parts by weight of a rubber containing a diene rubber alone or a diene rubber and a halogenated butyl rubber which are used in combination in a range of 95/5 to 50/50, and further adding and blending 0.5 to 3 parts by weight of sulfur and an accelerator so that a ratio of the sulfur and the accelerator falls in a range of 5 or less is used as an inner liner adjacent member (refer to, for example, patent document 3 filed by the present applicants), and
4) a tire for large-sized vehicles in which a rubber composition comprising a rubber component containing a natural rubber or a diene rubber, and containing at least one of specific hydrazone compounds is used for a rubber layer brought into direct contact with an inner liner in order to enhance an adhesive power of a member adjacent to the above inner liner after thermally deteriorated (refer to, for example, patent document 4 filed by the present applicants).

However, the tires for heavy load vehicles, and the like disclosed in patent documents 1 to 4 described above involves a problem in terms of a still insufficient inhibition of a reduction in an elongation at break caused by heat aging of the rubber.

In particular, in the case of pneumatic tires for heavy load vehicles, specifically tires which are thermally affected to a large extent, though the tires have a thick tire gauge and generate a large amount of heat by rolling, an inner liner side is thermally affected to a large extent because of an insufficient exothermal effect. Accordingly, the existing situation is that a rubber adjacent to the inner liner is thermally aged by oxidative deterioration due to the influences of oxygen and heat permeated from an inner liner side and reduced in an elongation at break, whereby the rubber adjacent to the inner liner is liable to be cracked and that durability is intensely desired to be further enhanced.

CONVENTIONAL ART DOCUMENTS

Patent Documents

Patent document 1: Japanese Patent Application Laid-Open No. 2009-132835 (claims, examples and others)
Patent document 2: Japanese Patent Application Laid-Open No. 2008-144023 (claims, examples and others)
Patent document 3: Japanese Patent Application Laid-Open No. Sho. 60-261706 (claims, examples and others)
Patent document 4: Japanese Patent Application Laid-Open No. 2004-114903 (claims, examples and others)

DISCLOSURE OF THE INVENTION

In light of the conventional problems and the existing situation described above, the present invention intends to solve the problems, and an object thereof is to provide a pneumatic tire suited to use in heavy load vehicles such as large-sized vehicles, which is inhibited from being reduced in breaking elongation due to heat aging of the rubber to make it possible to improve durability of a tire for heavy load vehicles.

Intense investigations repeated by the present inventors have resulted in finding that a pneumatic tire suited to use in heavy load vehicles which meets the object described above is obtained by a pneumatic tire in which a rubber layer (A) having an excellent air impermeability is disposed as an inner liner at an innermost layer side of the tire and in which a rubber layer (B) disposed between the above inner liner and a carcass ply layer and adjacent to the above inner liner comprises a rubber composition containing a natural rubber alone or a natural rubber and a synthetic diene rubber as a rubber component, wherein a rubber component of the rubber layer (A) contains a rubber having specific physical properties in a specific amount or more; the rubber layer (B) is composed of a rubber composition containing sulfur and a vulcanization accelerator in the respective specific amounts based on the rubber component and in a specific ratio; and an elongation at break after subjected to air heat aging is controlled to a specific value or more. Thus, the present invention has been come to complete.

That is, the present invention resides in the following items (1) to (4):

(1) A pneumatic tire in which a rubber layer (A) having an excellent air impermeability is disposed as an inner liner at an innermost layer side of the tire and in which a rubber layer (B) disposed between the above inner liner and a carcass ply layer and adjacent to the above inner liner comprises a rubber composition containing a natural rubber alone or a natural rubber and a synthetic diene rubber as a rubber component, wherein the rubber layer (A) contains a butyl rubber alone or a blend rubber of a diene rubber and a butyl rubber as a rubber component, and 30 parts by mass or more of the butyl rubber is contained based on 100 parts by mass of the rubber component; the rubber layer (B) is composed of a rubber composition which contains 0.5 to 2.3 parts by mass of sulfur when less than 1.0 part by mass of a bismaleimide compound as a cross-linking agent is contained based on 100 parts by mass of the rubber component or 0.4 to 2.3 parts by mass of the sulfur when 1.0 part by mass or more of the bismaleimide compound as a cross-linking agent is contained based on 100 parts by mass of the rubber component, and 0.5 to 3.0 parts by mass of a vulcanization accelerator and in which a blend amount of the sulfur and a blend amount of the vulcanization accelerator satisfy the following equation (I); and an elongation at break after subjected to air heat aging at 100° C. for 250 hours is 150% or more:

$$(\text{vulcanization accelerator}) \leq (-2.14) \times (\text{sulfur}) + 5.43 \qquad (I)$$

(2) The pneumatic tire as described in the above item (1), wherein the rubber layer (B) is composed of a rubber composition containing 1.0 to 1.5 part by mass of the sulfur and 1.0 to 2.0 parts by mass of the vulcanization accelerator based on 100 parts by mass of the rubber component; and an elongation at break after subjected to air heat aging at 100° C. for 500 hours is 150% or more.

(3) The pneumatic tire as described in the above item (1) or (2), wherein the rubber layer (B) is composed of a rubber composition containing 0.4 to 1.0 part by mass of the sulfur, 1.5 to 3.0 parts by mass of the vulcanization accelerator and 1.0 part by mass or more of the bismaleimide compound as a cross-linking agent based on 100 parts by mass of the rubber component; and an elongation at break after subjected to air heat aging at 100° C. for 1000 hours is 150% or more.

(4) The pneumatic tire as described in any one of the above items (1) to (3), wherein the pneumatic tire is a pneumatic tire for heavy load vehicles.

According to the invention disclosed in claim 1, provided is a pneumatic tire in which a rubber layer (A) having an excellent air impermeability is disposed as an inner liner and in which a rubber layer (B) disposed between the above inner liner and a carcass ply layer and adjacent to the above inner liner is inhibited from being reduced in breaking elongation due to heat aging and sufficiently secured in an adhesive property with the inner liner, whereby durability of a pneumatic tire for heavy load vehicles is improved to a large extent.

According to the inventions disclosed in claims 2 to 3, provided is a pneumatic tire in which durability of a pneumatic tire for heavy load vehicles is improved to further large extent by further inhibiting the rubber layer (B) adjacent to the inner liner from being reduced in breaking elongation due to heat aging.

According to the invention disclosed in claim 4, a pneumatic tire suited to use in heavy load vehicles is provided.

MODE FOR CARRYING OUT THE INVENTION

Figure 1:
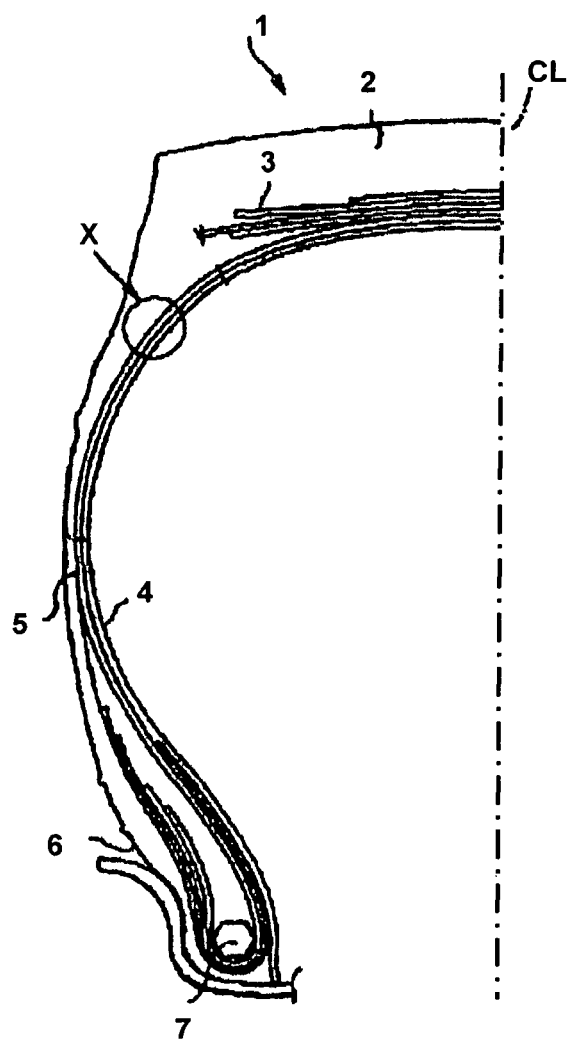
FIG. 1 is a partial vertical cross section of a pneumatic tire for heavy load vehicles showing one example of the embodiment of the present invention.

The embodiments of the present invention shall be explained in detail below by every invention.

The pneumatic tire of the present invention is a pneumatic tire in which a rubber layer (A) having an excellent air impermeability is disposed as an inner liner at an innermost layer side of the tire and in which a rubber layer (B) disposed between the above inner liner and a carcass ply layer and adjacent to the above inner liner comprises a rubber composition containing a natural rubber alone or a natural rubber and a synthetic diene rubber as a rubber component, wherein the rubber layer (A) contains a butyl rubber alone or a blend rubber of a diene rubber and a butyl rubber as a rubber component, and 30 parts by mass or more of the butyl rubber is contained based on 100 parts by mass of the rubber component; the rubber layer (B) is composed of a rubber composition which contains 0.5 to 2.3 parts by mass of sulfur when less than 1.0 part by mass of a bismaleimide compound as a cross-linking agent is contained based on 100 parts by mass of the rubber component or 0.4 to 2.3 parts by mass of the sulfur when 1.0 part by mass or more of the bismaleimide compound as a cross-linking agent is contained based on 100 parts by mass of the rubber component, and 0.5 to 3.0 parts by mass of a vulcanization accelerator and in which a blend amount of the sulfur and a blend amount of the vulcanization accelerator satisfy the following equation (I); and an elongation at break after subjected to air heat aging at 100° C. for 250 hours is 150% or more:

$$(\text{vulcanization accelerator}) \leq (-2.14) \times (\text{sulfur}) + 5.43 \qquad (I)$$

The rubber layer (A) used in the pneumatic tire of the present invention is used as an inner liner at an innermost layer side of the tire and composed of a rubber layer having an excellent air impermeability.

A butyl rubber alone or a blend rubber of a diene rubber and a butyl rubber is used as the rubber component of the rubber layer (A). In the case of the blend, the butyl rubber has to be contained in an amount of 30 parts by mass or more based on 100 parts by mass of the rubber component from the viewpoint of the air impermeability.

For example, a bromobutyl rubber (Br-IIR), a chlorobutyl rubber (Cl-IIR) and a butyl rubber (IIR) are used as the butyl rubber described above, and the bromobutyl rubber is preferred.

Also, the diene rubber blended with the butyl rubber includes such as, for example, a natural rubber (NR), an isoprene rubber (IR), a styrene-butadiene rubber (SBR), a polybutadiene rubber (BR), an acrylonitrile-butadiene rubber (NBR), and a chloroprene rubber (CR), and the diene rubbers may be used alone or in combination of two or more kinds thereof.

The rubber layer (B) used in the pneumatic tire of the present invention is a rubber layer disposed between the rubber layer (A) which is the inner liner described above and the carcass ply layer and adjacent to the above inner liner.

The rubber layer (B) adjacent to the above inner liner is composed of a rubber composition containing a natural rubber alone or a natural rubber and a synthetic diene rubber as a rubber component, and an elongation at break after subjected to air heat aging at 100° C. for 250 hours has to be 150% or more in terms of exerting the effects of the present invention.

The rubber composition used for the rubber layer (B) adjacent to the inner liner contains 0.5 to 2.3 parts by mass of sulfur when less than 1.0 part by mass (0 to less than 1.0 part by mass) of the bismaleimide compound as a cross-linking agent is contained based on 100 parts by mass of the rubber component or 0.4 to 2.3 parts by mass of the sulfur when 1.0 part by mass or more of the bismaleimide compound as a cross-linking agent is contained based on 100 parts by mass of the rubber component, and 0.5 to 3.0 parts by mass of the vulcanization accelerator, and a blend amount of the sulfur and a blend amount of the vulcanization accelerator satisfy the following equation (I), whereby the breaking elongation after subjected to air heat aging at 100° C. for 250 hours can be controlled to 150% or more:

$$(\text{vulcanization accelerator}) \leq (-2.14) \times (\text{sulfur}) + 5.43 \quad (I)$$

The synthetic diene rubber used includes such as, for example, an isoprene rubber (IR), a styrene-butadiene rubber (SBR), a polybutadiene rubber (BR), an acrylonitrile-butadiene rubber (NBR), and a chloroprene rubber (CR), and the synthetic diene rubber may be used alone or in combination of two or more kinds thereof.

Also, the vulcanization accelerator used shall not specifically be restricted, and at least one of vulcanization accelerators such as, for example, guanidines, thiurams, dithiocarbamines, thiazoles, and sulfenamides can be used. In particular, the vulcanization accelerators of sulfenamides such as N-cyclohexylbenzothiazolesulfenamide, and N-t-butyl-2-benzothiazolesulfenamide are preferably used.

In the rubber layer (B) adjacent to the inner liner, a proportion of a blend amount of the sulfur and a blend amount of the vulcanization accelerator each described above is modified to the range of equation (I) described above, whereby the breaking elongation after subjected to air heat aging can be inhibited from being reduced to a large extent, and the adhesive property with the inner liner can sufficiently be secured.

If a blend amount of the sulfur is less than 0.5 (or 0.4) part by mass, an elastic modulus of the rubber is insufficiently low. On the other hand, if the blend amount exceeds 2.3 parts by mass, the breaking elongation after subjected to air heat aging at 100° C. for 250 hours is 150% or less, and durability is unsatisfactory.

Also, if a blend amount of the vulcanization accelerator is less than 0.5 part by mass, the vulcanization reaction is slow, and the efficiency is deteriorated. On the other hand, if the vulcanization accelerator is blended in an amount exceeding 3.0 parts by mass, the effects are unchanged, and the cost is unnecessarily elevated.

Further, in addition to the blend amounts of the sulfur and the vulcanization accelerator which fall in the ranges described above, the ranges of the foregoing equation (I) satisfying the relationship of a blend amount of the sulfur and a blend amount of the vulcanization accelerator have to be fulfilled. Fulfilling the ranges of the equation. (I) described above makes it possible to achieve the breaking elongation after subjected to air heat aging at 100° C. for 250 hours to 150% or more to obtain the satisfactory durability and sufficiently secure the adhesive property with the inner liner.

The rubber layer (B) adjacent to the inner liner contains preferably 1.0 to 1.5 part by mass of the sulfur and 1.0 to 2.0 parts by mass of the vulcanization accelerator based on 100 parts by mass of the rubber component and is composed preferably of the rubber composition falling in the ranges of the equation (I) described above to achieve the breaking elongation after subjected to air heat aging at 100° C. for 500 hours to 150% or more (hereinafter, the above layer is referred to as "a B-1 layer").

Since the larger heat resistance and the larger durability than the heat resistance and durability of the rubber layer (B) described above are obtained by constituting the layer (B-1 layer) in the manner described above, no problem is involved in durability of the adjacent members even if the temperature of the tire is elevated by 10 degrees in the same use period as ever, and durability is further enhanced.

The rubber layer (B) adjacent to the inner liner contains preferably 0.4 to 1.0 part by mass of the sulfur, 1.5 to 3.0 parts by mass of the vulcanization accelerator and 1 part by mass or more of the bismaleimide compound as a cross-linking agent based on 100 parts by mass of the rubber component and is composed preferably of the rubber composition falling in the ranges of the equation (I) described above to achieve the breaking elongation after subjected to air heat aging at 100° C. for 1000 hours to 150% or more (hereinafter, the above layer is referred to as "a B-2 layer").

Since the larger heat resistance and the larger durability than the heat resistance and durability of the preferred rubber layer (B-1 layer) described above are obtained by constituting the layer (B-2 layer) in the manner described above, no problem is involved in durability of the adjacent members even if the temperature of the tire is elevated by 15 degrees in the same use period as ever, and durability is further enhanced. In the above embodiment, when a blend amount of the sulfur is smaller than 1.0 part by mass, the rubber tends to be reduced in an elastic modulus and weakened in an adhesive power with the butyl rubber, but the elastic modulus and the adhesive power can be supplemented by adding the bismaleimide compound. The above bismaleimide compound forms the cross-linkage having a high durability.

The usable bismaleimide compound shall not specifically be restricted, and a bismaleimide compound represented by the following structural formula (i) can suitably be used:

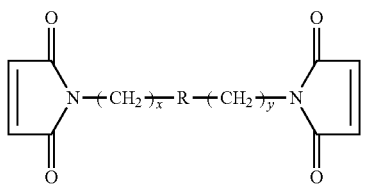

(wherein R represents an aromatic group having 6 to 18 carbon atoms or an alkyl aromatic group having 7 to 24 carbon atoms; and x and y each represent independently any integer of 0 to 3).

Capable of being shown as the examples thereof are such as, for example, N,N'-1,2-phenylenebismaleimide, N,N'-1,3-phenylenebismaleimide (m-phenylenebismaleimide in another name), N,N'-1,4-phenylenebismaleimide, N,N'-(4,4'-diphenylmethane)bismaleimide, 2,2-bis[4-(4-maleimidephenoxy)phenyl] propane, and bis(3-ethyl-5-methyl-4-maleimidephenyl)methane. N,N'-(4,4'-diphenylmethane) bismaleimide is particularly preferred, and at least one of bismaleimides can be contained.

A content of the above bismaleimide compounds is preferably 0.5 to 3.0 parts by mass based on 100 parts by mass of the rubber component from the viewpoints of forming the cross-linkage having a large heat resistance and exerting the effects of the present invention to a high degree.

Other rubber blending agents such as, for example, carbon blacks, zinc oxide, antioxidants, and stearic acid can suitably be added, if necessary, to the rubber compositions of the rubber layer (A) and the rubber layer (B) each described above used in the pneumatic tire of the present invention, and the rubber compositions are obtained by kneading the compositions by means of a closed kneading equipment such as a Banbury mixer, and an inter mixer, and a kneading equipment such as a roll.

Also, the pneumatic tire of the present invention is produced by an ordinary method using the respective rubber compositions of the rubber layers (A) and (B) described above. That is, the respective rubber compositions for the rubber layers (A) and (B) to which various chemicals are added, if necessary, in the manner described above are extruded and processed into the respective members for the tire at an unvulcanized stage, and the respective members are stuck and molded into a green tire on a tire molding oven by an ordinary method. The above green tire is heated and pressed in a vulcanizing oven to obtain the targeted pneumatic tire suited to use in heavy load vehicles. Usual air or air having a modified partial pressure of oxygen and inert gases such as nitrogen can be used for a gas filled into the tire.

Next, the pneumatic tire of the present invention shall be explained according to the attached drawings. FIG. 1 shows one example of the embodiments of the present invention and is a partial vertical cross section of a left half of a pneumatic tire for heavy load vehicles. The above tire 1 is provided with one carcass ply layer 5, and both end parts of the carcass ply layer 5 in a lateral direction are wound up respectively on a bead core 7 of a bead part 6 and adhered thereto.

Figure 2:
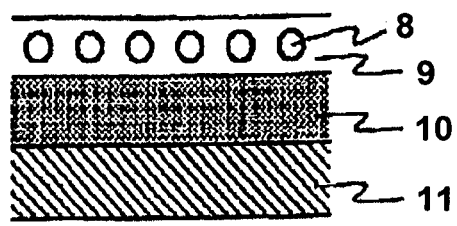
FIG. 2 is a partially enlarged drawing of an arrow X in FIG. 1.

Provided are a belt layer 3 disposed at an outside of the above carcass ply layer 5 in a tire radius direction and a tread 2 arranged in a tire radius direction of the above belt layer 3. FIG. 2 is a partially enlarged drawing from the carcass ply layer 5 to an inner liner 4 in the pneumatic tire of the present invention. A carcass coating rubber layer 9 coating a steel cord 8, a rubber layer (B) 10 brought into direct contact with the above coating rubber, and an inner liner (A) layer 11 are arranged in the described order.

In the present invention thus constituted, obtained is a pneumatic tire in which the rubber layer having an excellent air impermeability is disposed as an inner liner and in which the rubber layer (B) disposed between the above inner liner and a carcass ply layer and adjacent to the inner liner is inhibited from being reduced in an elongation at break due to heat aging and sufficiently secured in an adhesive property with the inner liner, whereby durability of a pneumatic tire for heavy load vehicles is improved to a large extent.

Preferably, the pneumatic tire constituted in the manner described above can suitably be applied to a pneumatic tire for heavy load vehicles having a rim diameter of 25 inch or more in the tire.

EXAMPLES

Next, the present invention shall be explained in further details with reference to examples and comparative examples, but the present invention shall by no means be restricted to the following examples.

Examples 1 to 9 and Comparative Examples 1 to 7

A composition containing 100 parts by mass of a bromobutyl rubber, 50 parts by mass of carbon black (GPF), 3 parts by mass of zinc oxide, 1 part by mass of stearic acid, 1 part by mass of a vulcanization accelerator (DM, di-2-benzothiazolyldisulfide, Nocceler DM-P, manufactured by Ouchi Shinko Chemical Industrial Co., Ltd.) and 1.5 part by mass of sulfur was used as a rubber composition for an inner liner to prepare the rubber layer (B) adjacent to the rubber layer (A) in a content shown in Table 1 described below, and a tire having a size of 4000R57 was prepared by an ordinary method.

The respective trial tires thus obtained were used to evaluate an adhesive property of the rubber layer (A) with the rubber layer (B) and an elongation at break after subjected to heat aging by the following evaluation methods. The results thereof are shown in the following Table 1.

Evaluation Method of Adhesive Property:

A rubber layer at an inner side than a ply cord in a buttress position of the product tire was cut out from the tire in a width of 10 mm. An interface between the rubber layer A and the rubber layer B was partially opened by a knife, and the opened part was grasped by means of a chuck to carry out a peeling test at a tensile speed of 50 mm/minute.

It was evaluated to in the mark of "o" when the breaking point was present in an inside of the butyl rubber and evaluated in the mark of "x" when the rubber was peeled off in an interface between the butyl rubber and the adjacent rubber layer.

Evaluation Method of Breaking Elongation (Tensile Physical Property) after Subjected to Heat Aging:

In the same manner as described above, a rubber layer at an inner side than a ply cord in a buttress position of the product tire was cut out from the tire, and the rubber layer (A) was peeled from the rubber layer (B). Then, the rubber layer (B) was sliced to a thickness of about 1.0 mm, and the sliced rubber was subjected to air heat aging (JIS K6253: 2006, 100° C., 250 hours, 500 hours, 1000 hours) and then to a tensile test (JIS K6251: 2010) to measure and evaluate an elongation at break after the respective air heat aging treatments.

TABLE 1

| Blend component/ Evaluation | Comparative Example 1 | Example 1 | Example 2 | Example 3 | Comparative Example 2 | Example 4 | Example 5 |
|---|---|---|---|---|---|---|---|
| Natural rubber *1 | 100 | 100 | 100 | 100 | 100 | 100 | 100 |
| BR *2 | 0 | 0 | 0 | 0 | 0 | 0 | 0 |
| Carbon black (HAF) | 40 | 40 | 40 | 40 | 40 | 40 | 40 |
| Stearic acid | 2 | 2 | 2 | 2 | 2 | 2 | 2 |
| Oil *3 | 2 | 2 | 2 | 2 | 2 | 2 | 2 |
| Zinc oxide (ZnO) | 5 | 5 | 5 | 5 | 5 | 5 | 5 |
| Antioxidant (6PPD) *4 | 2 | 2 | 2 | 2 | 2 | 2 | 2 |
| Antioxidant (RD) *5 | 0.5 | 0.5 | 0.5 | 0.5 | 0.5 | 0.5 | 0.5 |
| Sulfur | 2.5 | 2.3 | 1.9 | 1.5 | 1.5 | 1 | 0.9 |
| Vulcanization accelerator *6 | | 0.5 | 1.3 | 1.6 | 2.5 | 2 | 2.5 |
| Bismaleimide compound 1 *7 | | | | | | | |
| Bismaleimide compound 2 *8 | | | | | | | |
| Z: (−2.14) × (sulfur) + 5.43 | 0.08 | 0.508 | 1.364 | 2.22 | 2.22 | 3.29 | 3.504 |
| Vulcanization accelerator ≤ Z . . . (I) Whether or not satisfying above equation (I) | — | ○ | ○ | ○ | x | ○ | ○ |
| Elongation at break (%) | | | | | | | |
| After 100° C. × 250 hr aging | 130 | 160 | 230 | 300 | 310 | 380 | 340 |
| After 100° C. × 500 hr aging | 60 | 80 | 130 | 170 | 170 | 240 | 190 |
| After 100° C. × 1000 hr aging | — | — | — | 50 | 60 | 80 | 60 |
| Adhesive property of inner liner layer | ○ | ○ | ○ | ○ | x | ○ | ○ |

| Blend component/ Evaluation | Comparative Example 3 | Comparative Example 4 | Example 6 | Example 7 | Example 8 | Example 9 | Comparative Example 5 | Comparative Example 6 | Comparative Example 7 |
|---|---|---|---|---|---|---|---|---|---|
| Natural rubber *1 | 100 | 100 | 100 | 100 | 100 | 80 | 100 | 100 | 100 |
| BR *2 | 0 | 0 | 0 | 0 | 0 | 20 | 0 | 0 | 0 |
| Carbon black (HAF) | 40 | 40 | 40 | 40 | 40 | 40 | 40 | 40 | 40 |
| Stearic acid | 2 | 2 | 2 | 2 | 2 | 2 | 2 | 2 | 2 |
| Oil *3 | 2 | 2 | 2 | 2 | 2 | 2 | 2 | 2 | 2 |
| Zinc oxide (ZnO) | 5 | 5 | 5 | 5 | 5 | 5 | 5 | 5 | 5 |
| Antioxidant (6PPD) *4 | 2 | 2 | 2 | 2 | 2 | 2 | 2 | 2 | 2 |
| Antioxidant (RD) *5 | 0.5 | 0.5 | 0.5 | 0.5 | 0.5 | 0.5 | 0.5 | 0.5 | 0.5 |
| Sulfur | 0.4 | 0.4 | 0.4 | 1 | 0.7 | 0.4 | 0.3 | 2.4 | 0.4 |
| Vulcanization accelerator *6 | 2.5 | 2.5 | 3 | 2 | 2.5 | 3 | 3 | 3 | 0.4 |
| Bismaleimide compound 1 *7 | | 0.8 | 3 | | 1.5 | 3 | 3 | 3 | 3 |
| Bismaleimide compound 2 *8 | | | | 1 | | | | | |
| Z: (−2.14) × (sulfur) + 5.43 | 4.574 | 4.574 | 4.574 | 3.29 | 3.932 | 4.574 | 4.788 | 0.294 | 4.574 |
| Vulcanization accelerator ≤ Z . . . (I) Whether or not satisfying above equation (I) | ○ | ○ | ○ | ○ | ○ | ○ | ○ | x | ○ |
| Elongation at break (%) | | | | | | | | | |
| After 100° C. × 250 hr aging | 540 | 430 | 460 | 350 | 420 | 440 | 480 | 140 | 490 |
| After 100° C. × 500 hr aging | 420 | 350 | 390 | 210 | 350 | 410 | 400 | 90 | 410 |
| After 100° C. × 1000 hr aging | 370 | 240 | 330 | 160 | 200 | 350 | 350 | — | 220 |
| Adhesive property of inner liner layer | x | x | ○ | ○ | ○ | ○ | x | ○ | x |

*1 to *8 in Table 1 show the followings.
*1: RSS#4
*2: BR01, manufactured by JSR Corporation
*3: Naphthene oil (Diana Process Oil NS 100, manufactured by Idemitsu Kosan Co., Ltd.)
*4: N-phenyl-N'-(1,3-dimethylbutyl)-p-phenylenediamine, Nocrac 6C, manufactured by Ouchi Shinko Chemical Industrial Co., Ltd.
*5: 2,2,4-trtimethyl-1,2-dihydroquinoline polymer, "Nocrac 224", manufactured by Ouchi Shinko Chemical Industrial Co., Ltd.
*6: N-cyclohexyl-2-benzothiazolylsulfeneamide, "Nocceler CZ", manufactured by Ouchi Shinko Chemical Industrial Co., Ltd.
*7: N,N'-(4,4'-diphenylmethane)bismaleimide, "BMI", manufactured by Daiwa Kasei Industrial Co., Ltd.
*8: m-phenylenebismaleimide, "PBM", manufactured by Daiwa Kasei Industrial Co., Ltd.

As apparent from the results shown in Table 1 described above, it has become clear that in Examples 1 to 9 falling in the scope of the present invention as compared with Comparative Examples 1 to 7 out of the scope of the present invention, obtained are pneumatic tires in which the rubber layer (B) adjacent to the inner liner is inhibited from being reduced in an elongation at break due to heat aging and sufficiently secured in an adhesive property with the inner liner, whereby durability of a pneumatic tire for heavy load vehicles is improved to a large extent.

To observe individually Comparative Examples 1 to 7, Comparative Example 1 is a case in which the vulcanization accelerator was not added; Comparative Example 2 is a case in which a blend amount of the sulfur and a blend amount of the vulcanization accelerator did not satisfy the equation (I); Comparative Examples 3 and 4 are cases in which a blend amount of the sulfur was out of the range (0.5 to 2.3) of the present invention when less than 1.0 part by mass of the bismaleimide compound was added as a cross-linking agent; in Comparative Examples 5 to 7, cases in which 1.0 part by mass or more of the bismaleimide compound was added are compared based on Example 6; Comparative Example 5 is a case in which a blend amount of the sulfur was out of the range (0.4 to 2.3) of the present invention; Comparative Example 6 is a case in which a blend amount of the sulfur was out of the range of the present invention and in which a blend amount of the sulfur and a blend amount of the vulcanization accelerator did not satisfy the equation (I); and Comparative Example 7 is a case in which a blend amount of the vulcanization accelerator was out of the range (0.5 to 3.0) of the present invention.

It has been found that in the cases of Comparative Examples 1 to 7, the rubber layer (B) adjacent to the inner liner cannot be inhibited from being reduced in an elongation at break due to heat aging or cannot sufficiently be secured in an adhesive property with the inner liner and that the effects of the present invention cannot be exerted.

INDUSTRIAL APPLICABILITY

The pneumatic tires of the present invention can suitably be used for pneumatic tires for heavy load vehicles.

NUMERAL and LETTERS

1: Pneumatic tire of the present invention for heavy load vehicles
2: Tread
3: Belt layer
4: Inner liner
5: Carcass ply layer
6: Bead part
7: Bead core
8: Steel cord
9: Ply coating rubber layer
10: Rubber layer (B)
11: Inner liner (A)

The invention claimed is:

1. A pneumatic tire in which a rubber layer (A) having an excellent air impermeability is disposed as an inner liner at an innermost layer side of the tire and in which a rubber layer (B) disposed between the inner liner and a carcass ply layer and adjacent to the inner liner comprises a rubber composition containing a natural rubber alone or a natural rubber and a synthetic diene rubber as a rubber component, wherein the rubber layer (A) contains:
    a butyl rubber alone or a blend rubber of a diene rubber and a butyl rubber as a rubber component, and 30 parts by mass or more of the butyl rubber is contained based on 100 parts by mass of the rubber component; the rubber layer (B) is composed of a rubber composition comprising 0.4 to 1.0 parts by mass of sulfur, 1.5 to 3.0 parts by mass of a vulcanization accelerator, and 1.0 part by mass or more of a bismaleimide compound as a cross-linking agent based on 100 parts by mass of the rubber component, and in which a blend amount of the sulfur and a blend amount of the vulcanization accelerator satisfy the following equation (I); and
    an elongation at break after subjected to air heat aging at 100° C. for 250 hours is 150% or more:

$$(\text{vulcanization accelerator}) \leq (-2.14) \times (\text{sulfur}) + 5.43 \qquad (I).$$

2. The pneumatic tire as described in claim 1, wherein an elongation at break after subjected to air heat aging at 100° C. for 1000 hours of the rubber composition for the rubber layer (B) is 150% or more.

3. The pneumatic tire as described in claim 1, wherein the pneumatic tire is a pneumatic tire for heavy load vehicles.

4. The pneumatic tire as described in claim 2, wherein the pneumatic tire is a pneumatic tire for heavy load vehicles.

5. The pneumatic tire as described in claim 1, wherein the pneumatic tire is a pneumatic tire for heavy load vehicles having a rim diameter of 25 inches or more.

* * * * *